US008050225B2

(12) United States Patent
Luo

(10) Patent No.: US 8,050,225 B2
(45) Date of Patent: Nov. 1, 2011

(54) ASSIGNMENT OF PRIMARY AND SECONDARY SYNCHRONIZATION CODE SEQUENCES TO CELLS IN A WIRELESS COMMUNICATION SYSTEM

(75) Inventor: Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 834 days.

(21) Appl. No.: 12/123,997

(22) Filed: May 20, 2008

(65) Prior Publication Data

US 2008/0291892 A1 Nov. 27, 2008

Related U.S. Application Data

(60) Provisional application No. 60/939,321, filed on May 21, 2007.

(51) Int. Cl.
  H04W 4/00 (2009.01)
  H04J 3/06 (2006.01)
  H04L 25/49 (2006.01)
  H04L 7/00 (2006.01)

(52) U.S. Cl. ........ 370/329; 370/350; 370/503; 370/509; 375/293; 375/354

(58) Field of Classification Search .......... 370/203–210, 370/310–350, 503–514; 375/145, 149, 240.2, 375/293, 354–368
See application file for complete search history.

(56) References Cited

U.S. PATENT DOCUMENTS

| 6,134,286 | A | 10/2000 | Chennakeshu et al. | |
| 6,272,335 | B1 | 8/2001 | Nakayama et al. | |
| 6,504,830 | B1 | 1/2003 | Ostberg et al. | |
| 6,804,315 | B2 * | 10/2004 | Demir et al. | 375/362 |
| 7,102,994 | B2 * | 9/2006 | Sezgin et al. | 370/209 |
| 7,110,782 | B2 * | 9/2006 | Yamaguchi | 455/502 |
| 7,860,152 | B2 * | 12/2010 | Dabak et al. | 375/146 |
| 7,920,598 | B2 * | 4/2011 | Luo | 370/509 |

(Continued)

FOREIGN PATENT DOCUMENTS

RU 2236088 9/2004

(Continued)

OTHER PUBLICATIONS

Wang, Yi-Pin Eric, Cell Search in W-CDMA, 2000, IEEE 0733-8716, pp. 1470-1482.*

(Continued)

*Primary Examiner* — Tri H Phan
(74) *Attorney, Agent, or Firm* — Howard H. Seo; Larry J. Moskowitz

(57) ABSTRACT

Techniques for assigning primary synchronization code (PSC) sequences and secondary synchronization code (SSC) sequences to cells in a wireless communication system are described. At least one PSC sequence and multiple SSC sequences may be used for multiple cells in a Node B. In one design, the available SSC sequences in the system may be arranged into groups, with each group including M different SSC sequences. Additional groups of M SSC sequences may be formed with different permutations (e.g., different cyclic shifts) of each group of M SSC sequences. In one design, three SSC sequences $SSC(G_1)$, $SSC(G_2)$ and $SSC(G_3)$ may be used for three cells in one Node B. A first permutation including $SSC(G_3)$, $SSC(G_1)$ and $SSC(G_2)$ may be used for three cells in another Node B. A second permutation including $SSC(G_2)$, $SSC(G_3)$ and $SSC(G_1)$ may be used for three cells in yet another Node B.

37 Claims, 8 Drawing Sheets

U.S. PATENT DOCUMENTS

2007/0133390 A1* 6/2007 Luo et al. ............... 370/208
2008/0273522 A1* 11/2008 Luo et al. ............... 370/350

FOREIGN PATENT DOCUMENTS

| WO | WO9925079 | 5/1999 |
| --- | --- | --- |
| WO | 2007055531 | 5/2007 |

OTHER PUBLICATIONS

International Search Report—PCT/US08/064401, International Search Authority—European Patent Office, Aug. 28, 20008.
Written Opinion—PCT/US08/064401, International Search Authority—European Patent Office, Aug. 28, 2008.

* cited by examiner

| Cell ID Group 0 | Cell ID 0 → PSC(0), SSC(0) |
|---|---|
| | Cell ID 1 → PSC(1), SSC(0) |
| | Cell ID 2 → PSC(2), SSC(0) |
| Cell ID Group 1 | Cell ID 3 → PSC(0), SSC(1) |
| | Cell ID 4 → PSC(1), SSC(1) |
| | Cell ID 5 → PSC(2), SSC(1) |
| Cell ID Group 2 | Cell ID 6 → PSC(0), SSC(2) |
| | Cell ID 7 → PSC(1), SSC(2) |
| | Cell ID 8 → PSC(2), SSC(2) |
| ⋮ | ⋮ |
| Cell ID Group 167 | Cell ID 501 → PSC(0), SSC(167) |
| | Cell ID 502 → PSC(1), SSC(167) |
| | Cell ID 503 → PSC(2), SSC(167) |

*FIG. 3*

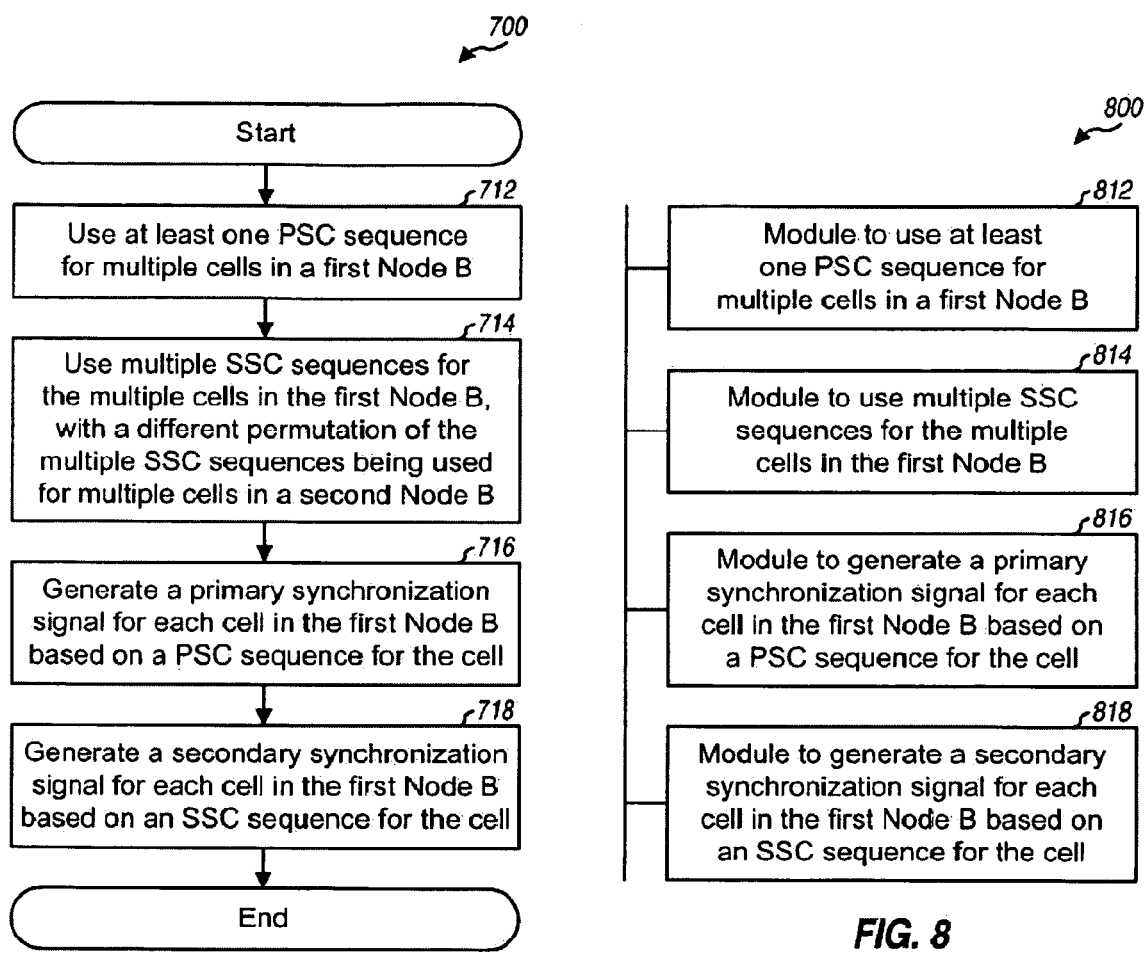

ASSIGNMENT OF PRIMARY AND SECONDARY SYNCHRONIZATION CODE SEQUENCES TO CELLS IN A WIRELESS COMMUNICATION SYSTEM

The present application claims priority to provisional U.S. Application Ser. No. 60/939,321, entitled "A METHOD AND APPARATUS FOR SSC GROUPING IN A WIRELESS COMMUNICATION SYSTEM," filed May 21, 2007, assigned to the assignee hereof and incorporated herein by reference.

BACKGROUND

I. Field

The present disclosure relates generally to communication, and more specifically to synchronization techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of Node Bs that can support communication for any number of user equipments (UEs). Each Node B may support one or more cells, where the term "cell" can refer to the smallest coverage area of a Node B and/or a Node B subsystem serving this coverage area. A UE (e.g., a cellular phone) may be within the coverage of one or more cells at any given moment. The UE may have just been powered on or may have lost coverage and thus may not know which cells can be received. The UE may perform cell search to detect for cells and to acquire timing and other information for detected cells.

Each cell may transmit primary and secondary synchronization signals to assist the UEs perform cell search. In general, a synchronization signal may be any signal that assists a receiver to detect for a transmitter and to obtain timing and/or other information for the transmitter. The synchronization signals represent overhead and should be transmitted as efficiently as possible. Furthermore, the synchronization signals should allow the UEs to quickly and efficiently perform cell search.

SUMMARY

Techniques for assigning primary synchronization code (PSC) sequences and secondary synchronization code (SSC) sequences to cells in a wireless communication system are described herein. These techniques may improve cell detection performance for UEs.

In one design, at least one PSC sequence and multiple SSC sequences may be used for multiple cells in a Node B. Each cell may be assigned a PSC sequence and an SSC sequence, which may be determined based on a cell identity (ID) of that cell. A primary synchronization signal may be generated for each cell based on the PSC sequence for that cell. A secondary synchronization signal may be generated for each cell based on the SSC sequence for that cell. The primary and secondary synchronization signals for each cell may be transmitted to assist the UEs perform cell search.

In one design, the available SSC sequences in the system may be arranged into groups, with each group including M SSC sequences, where M is greater than one. For each group of M SSC sequences, additional groups of M SSC sequences may be formed with different permutations (e.g., different cyclic shifts) of that group of M SSC sequences. The different groups of M SSC sequences may be assigned to cells in different Node Bs. The Node Bs assigned with different permutations of a given group of M SSC sequences may be spaced apart such that cells from at most one of these Node Bs can be detected by any UE.

In one design, three PSC sequences may be used for three cells in a Node B, and three SSC sequences $SSC(G_1)$, $SSC(G_2)$ and $SSC(G_3)$ may be used for the three cells in the Node B, where $G_1$, $G_2$ and $G_3$ are indices of the three SSC sequences. A first permutation comprising $SSC(G_3)$, $SSC(G_1)$ and $SSC(G_2)$ (which corresponds to a cyclic shift of the indices by one) may be used for three cells 1, 2 and 3, respectively, in another Node B. A second permutation comprising $SSC(G_2)$, $SSC(G_3)$ and $SSC(G_1)$ (which corresponds to a cyclic shift of the indices by two) may be used for three cells 1, 2 and 3, respectively, in yet another Node B. This design results in a different combination of PSC sequence and SSC sequence being used for each cell in the three Node Bs.

Various aspects and features of the disclosure are described in further detail below.

BRIEF DESCRIPTION OF THE DRAWINGS

FIG. 3 shows a mapping of cell IDs to PSC and SSC sequences.

FIG. 7 shows a process for transmitting synchronization signals.

FIG. 8 shows an apparatus for transmitting synchronization signals.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma200 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
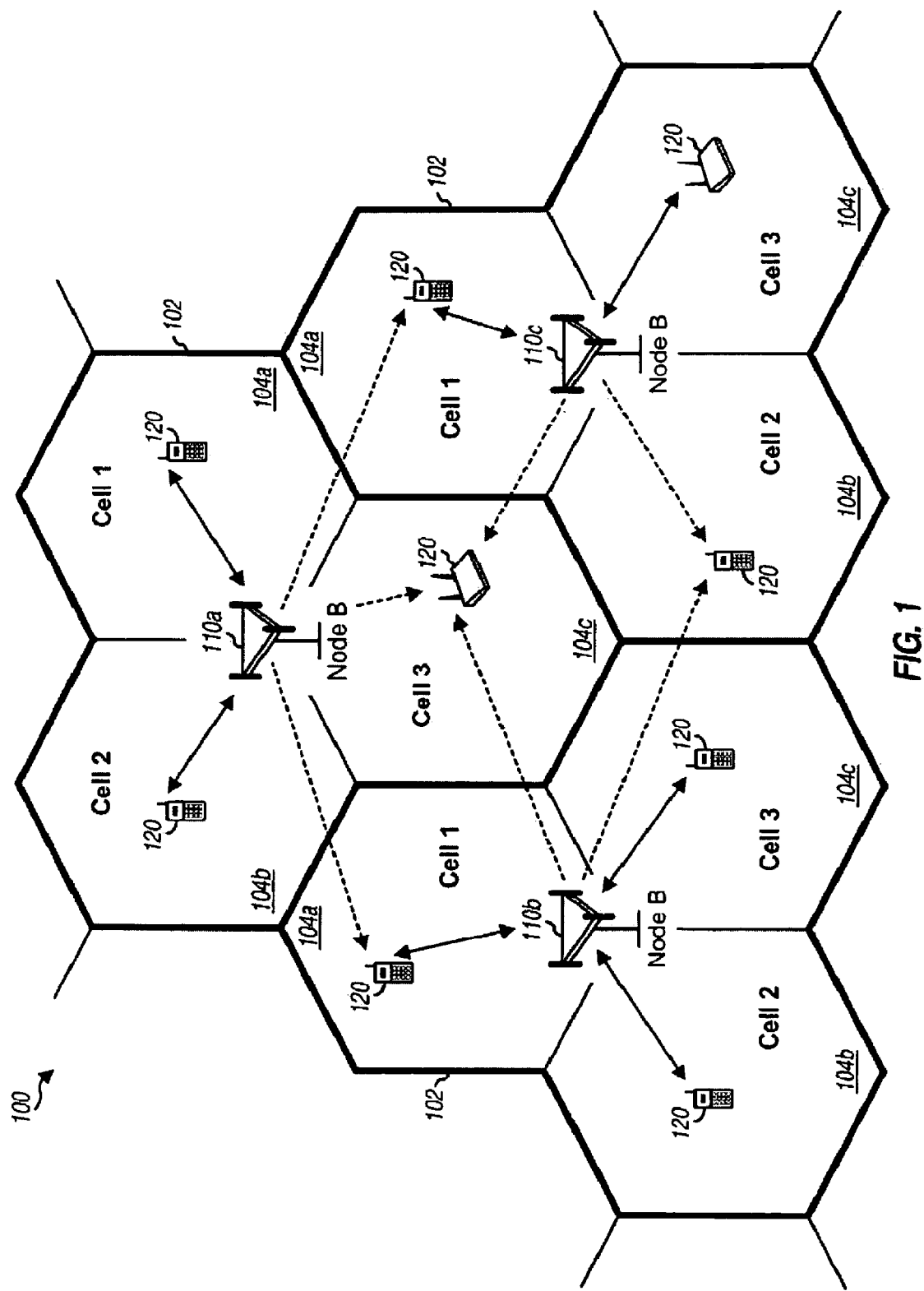
FIG. 1 shows a wireless communication system.

FIG. 1 shows a wireless communication system 100 with multiple Node Bs. For simplicity, only three Node Bs 110a, 110b and 110c are shown in FIG. 1. A Node B may be a fixed station used for communicating with the UEs and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area and/or a subsystem serving this coverage, area. For clarity, 3GPP concept of cell is used in the description below.

In the example shown in FIG. 1, each Node B 110 has three cells 1, 2 and 3 that cover different geographic areas. The cells of Node Bs 110a, 110b and 110c may operate on the same frequency or different frequencies. For clarity, FIG. 1 shows the cells of the Node Bs not overlapping one another. In a practical deployment, the adjacent cells of each Node B typically overlap one another at the edges. Furthermore, each cell of each Node B typically overlaps one or more other cells of one or more adjacent Node Bs at the edges. This overlapping of coverage edges may ensure that a UE can receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates communication between a Node B and a UE. A broken line with a single arrow indicates a UE receiving a downlink signal from a Node B. A UE may perform cell search based on the downlink signals transmitted by the Node Bs.

In system 100, Node Bs 110 may periodically transmit synchronization signals to allow UEs 120 to detect for the cells in each Node B and to obtain information such as timing, frequency offset, cell ID, etc. The synchronization signals may be generated and transmitted in various manners. In one design that is described in detail below, each Node B periodically transmits a primary synchronization signal and a secondary synchronization signal for each cell in that Node B. A primary synchronization signal may also be referred to as a PSC, a primary synchronization channel (P-SCH), etc. A secondary synchronization signal may also be referred to as an SSC, a secondary synchronization channel (S-SCH), etc. The primary and secondary synchronization signals may also be referred to by other names.

Figure 2:
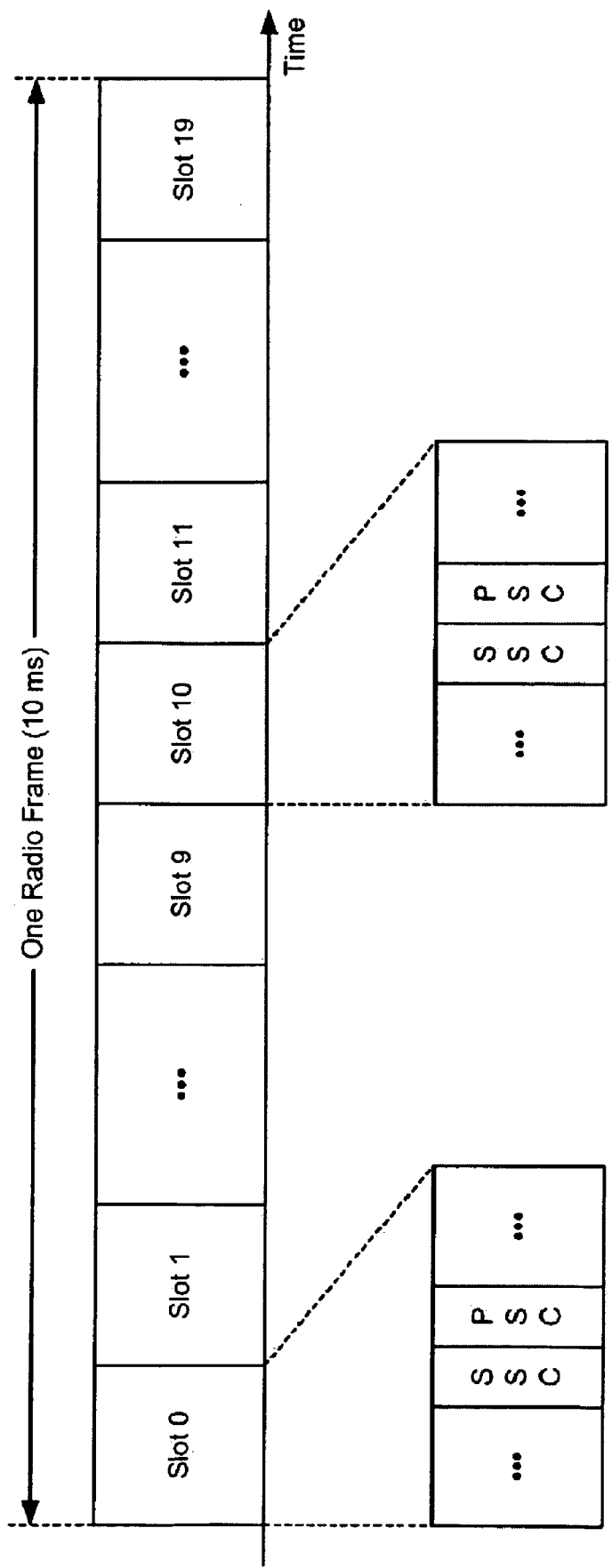
FIG. 2 shows transmission of primary and secondary synchronization signals.

FIG. 2 shows an example transmission of the primary and secondary synchronization signals for one cell in accordance with one design. The transmission timeline for the downlink may be partitioned into units of radio frames. Each radio frame may have a predetermined duration (e.g., 10 milliseconds (ms)) and may be partitioned into 20 slots with indices of 0 through 19. Each slot may cover a fixed or configurable number of orthogonal frequency division multiplexing (OFDM) symbols, e.g., six or seven OFDM symbols. In the design shown in FIG. 2, the primary and secondary synchronization signals are sent in two OFDM symbols in each of slots 0 and 10 of each radio frame. In general, the primary and secondary synchronization signals may each be sent at any rate, e.g., any number of times in each radio frame. The secondary synchronization signal may be sent near (e.g., either immediately before or after) the primary synchronization signal, so that a channel estimate may be derived from the primary synchronization signal and used for coherent detection of the secondary synchronization signal.

Each cell may be assigned a cell ID that is unique among all cells within a certain range of that cell. This would allow each UE to uniquely identify all cells detected by that UE regardless of the UE location. The system may support a set of cell IDs. Each cell may then be assigned a specific cell ID from the supported set of cell IDs.

In one designs each cell may convey its cell ID in the primary and secondary synchronization signals transmitted by that cell. To reduce detection complexity for the UEs, the cell ID may be partitioned into two parts. A first cell ID part may be conveyed in the primary synchronization signal. A second cell ID part may be conveyed in the secondary synchronization signal.

A UE may detect for the primary and secondary synchronization signals from cells using a two-stage detection process. In a PSC detection stage, the UE may detect for primary synchronization signals from cells. Since the UE may not have cell timing in this stage, the UE may detect for the primary synchronization signals in each sample period. It is desirable to have a relatively small first cell ID part in order to reduce the number of hypotheses to test in each sample period for the PSC detection stage. In an SSC detection stage, the UE may detect for the secondary synchronization signal from each cell with a detected primary synchronization signal.

In one design, a set of 504 unique cell IDs is supported by the system. The 504 cell IDs are grouped into 168 unique cell ID groups, and each cell ID group contains three unique cell IDs. The grouping is such that each cell ID is included in only one cell ID group. A cell ID may be expressed as:

$$C_{ID} = 3 \cdot G_{ID} + N_{ID}, \quad\quad\quad \text{Eq (1)}$$

where $C_{ID} \in \{0, \ldots, 503\}$ is the cell ID, $G_{ID} \in \{0, \ldots, 167\}$ is an index of a cell ID group to which the cell ID belongs, and $N_{ID} \in \{0, 1, 2\}$ is an index of a specific ID within the cell ID group.

In the design shown in equation (1), a cell ID is uniquely defined by (i) a first number within a range of 0 to 167 and representing the cell ID group and (ii) a second number within a range of 0 to 2 and representing an ID within the cell ID group.

Three PSC sequences may be defined for the three possible values of $N_{ID}$, i.e., for the three cell IDs in each group. In addition, 168. SSC sequences may be defined for the 168 possible values of $G_{ID}$, i.e., for the 168 possible cell ID groups. The PSC and SSC sequences may be expressed as:

PSC($N_{ID}$) represents a PSC sequence for index $N_{ID}$, where $N_{ID} \in \{0, 1, 2\}$, and SSC($G_{ID}$) represents an SSC sequence for index $G_{ID}$, where $G_{ID} \in \{0, \ldots, 167\}$.

The three PSC sequences may be denoted as PSC(0), PSC(1) and PSC(2). The 168 SSC sequences may be denoted as SSC(0), SSC(1), ..., SSC(167). A PSC sequence may also be referred to as a PSC code, a P-SCH code, a primary synchronization sequence, etc. An SSC sequence may also be referred to as an SSC code, an S-SCH code, a secondary synchronization sequence, etc.

FIG. 3 shows a mapping of cell IDs to PSC and SSC sequences in accordance with equation (1). The cell IDs may range from 0 to 503 and may be divided into cell ID groups 0 to 167, with each cell ID group including three consecutive cell IDs. The three cell IDs in each group m may be mapped to PSC(0), PSC(1) and PSC(2) and the same SSC(m). Thus, cell ID 0 may be mapped to PSC(0) and SSC(0), cell ID 1 may be mapped to PSC(1) and SSC(0), and so on, and cell ID 503 may be mapped to PSC(2) and SSC(167).

The PSC and SSC sequences may be generated in various manners. In one design, a PSC sequence may be generated based on a Zadoff-Chu sequence, as follows:

$$d_{psc}(n) = \begin{cases} e^{-j\frac{\pi \cdot u \cdot n \cdot (n+1)}{63}} & \text{for } n = 0, 1, \ldots, 30 \\ e^{-j\frac{\pi \cdot u \cdot (n+1) \cdot (n+2)}{63}} & \text{for } n = 31, 32, \ldots, 61 \end{cases} \quad \text{Eq (2)}$$

where u is a root index determined by $N_{ID}$, and $d_{psc}(n)$ is a PSC sequence, with n being a sample index. Different PSC sequences may be generated with different indices u for the Zadoff-Chu sequence, with u being determined by $N_{ID}$. For example, u may be equal to 25, 29 and 34 for $N_{ID}$ of 0, 1 and 2, respectively In one design, an SSC sequence may be generated based on a maximum length sequence (M-sequence), as follows:

$$d_{ssc}(2n) = \begin{cases} s_0(n) \cdot c_0(n) & \text{in slot 0} \\ s_1(n) \cdot c_0(n) & \text{in slot 10} \end{cases} \text{for } n = 0, 1, \ldots, 30, \quad \text{Eq (3a)}$$

$$d_{ssc}(2n+1) = \quad \text{Eq (3b)}$$
$$\begin{cases} s_1(n) \cdot c_1(n) \cdot z_0(n) & \text{in slot 0} \\ s_0(n) \cdot c_1(n) \cdot z_1(n) & \text{in slot 10} \end{cases} \text{for } n = 0, 1, \ldots, 30,$$

where $s_0(n)$ and $s_1(n)$ are two cyclic shifts of the M-sequence and generated based on $G_{ID}$, $c_0(n)$ and $c_1(n)$ are two scrambling sequences generated based on $N_{ID}$, $z_0(n)$ and $z_1(n)$ are two scrambling sequences generated based on $G_{ID}$, and $d_{ssc}(n)$ is an SSC sequence.

In the design shown in equation set (3), two cyclic shifts of the M-sequence are interleaved and scrambled to generate an SSC sequence. The SSC sequence for slot 0 is generated in a different manner than the SSC sequence for slot 10. Different SSC sequences may be generated with different cyclic shifts of the M-sequence, with the cyclic shifts being determined by $G_{ID}$.

Generation of the PSC sequences based on die Zadoff-Chu sequence and generation of the SSC sequences based on the M-sequence are described in 3GPP TS 36.211, entitled "Evolved Universal Terrestrial Radio Access (E-UTRA); Physical Channels and Modulation (Release 8)," which is publicly available. The PSC and SSC sequences may also be generated in other manners.

In general, the system may support any number of cell IDs, the cell IDs may be arranged in any number of groups, and each group may include any number of cell IDs. The number of groups and the number of cell IDs in each group may be selected based on PSC and SSC detection complexity. A smaller group size corresponds to reduced PSC detection complexity and greater SSC detection complexity. The converse is true for a larger group size. For clarity, much of the description below is for the design shown in equation (1) with 168 cell ID groups and three cell IDs in each cell ID group.

A PSC sequence may be processed to generate a primary synchronization signal. An SSC sequence may be processed to generate a secondary synchronization signal. There may be a one-to-one mapping between the PSC sequence and the primary synchronization signal and also a one-to-one mapping between the SSC sequence and the secondary synchronization signal.

In an aspect, the cells in the system may be assigned PSC and SSC sequences in a manner to improve cell detection performance by the UEs. In one design, adjacent cells in a Node B may be assigned different PSC sequences. If the Node B has three cells, then a first cell may be assigned PSC(0), a second cell may be assigned PSC(1), and a third cell may be assigned PSC(2). If the Node B has fewer than three cells, then a subset of the three PSC sequences may be used, one PSC sequence for each cell. If the Node B has more than three cells, then the three PSC sequences may be used more than once, e.g., by cycling through the three PSC sequences as many times as needed and assigning adjacent cells with different PSC sequences. In another design, one PSC sequence may be used for all of the cells in a Node B.

In one design, different cells in a Node B may be assigned different SSC sequences, so that no two cells are assigned the same SSC sequence. Different groups of SSC sequences may be formed based on all available SSC sequences in the system. Each group may contain different SSC sequences that may be assigned to different cells in a Node B.

In one design, a different combination of PSC sequence and SSC sequence is used for each cell in a Node B. This design may prevent the UEs from observing phase mismatch between the PSC and SSC, which is also referred to as an "SFN" effect. A UE may detect a PSC from a cell and may then use the PSC as a phase reference for coherent detection of an SSC from the cell. The phase of the PSC may or may not match the phase of the SSC depending on how the PSC and SSC sequences are assigned to cells.

If a Node B has three cells that are assigned three different PSC sequences and the same SSC sequence, then the UE may estimate complex channel gains of $h_1$, $h_2$ and $h_3$ for the three cells based on the three different primary synchronization signals from these cells. However, the three secondary synchronization signals from these cells would be identical and may be received with a complex channel gain of $h=h_1+h_2+h_3$ at the UE. There would thus be phase mismatch if any one of the channel gains $h_1$, $h_2$ and $h_3$ is used for coherent detection of the secondary synchronization signal.

If the three cells in the Node B are assigned three different PSC sequences and three different SSC sequences, then the UE would receive the three secondary synchronization signals with complex channel gains of $h_1$, $h_2$ and $h_3$ for the three cells. The UE would then be able to perform coherent detection for the secondary synchronization signal from each cell with the channel gain derived from the primary synchronization signal from that cell.

The use of different SSC sequences for different cells in each Node B may also prevent the UEs from observing phase mismatch between the SSC and downlink physical channels sent by these cells. After detecting an SSC from a cell, the UE may use the SSC as a phase reference for demodulating other physical channels sent by the cell. These physical channels may include a physical broadcast channel (PBCH) carrying broadcast data, a physical downlink shared channel (PDSCH) carrying traffic data, a physical downlink control channel (PDCCH) carrying control information or signaling, etc. By using different SSC sequences for different cells in the Node B, the UE can obtain an unambiguous channel estimate for each cell based on the secondary synchronization signal from that cell. The UE may then demodulate other physical channels from each cell based on the channel estimate derived from the secondary synchronization signal for that cell.

In one design, a group of M different SSC sequences may be formed and assigned to M different cells in one Node B, where M may be any integer value greater than one. The indices of the M SSC sequences may be denoted as $G_1$, $G_2$, $G_3$, ..., $G_M$, where $G_m \in \{0, ..., 167\}$ for m=1, ..., M. The group of M SSC sequences may be denoted as $SSC(G_1)$, $SSC(G_2)$, $SSC(G_3)$, ..., $SSC(G_M)$. Additional groups of M SSC sequences may be obtained based on different permutations of the M SSC sequences, with each permutation corresponding to a different ordering of the M SSC sequences.

In one design, M permutations of a group of M SSC sequences may be obtained by cyclically shifting the group of M SSC sequences, as follows:
$SSC(G_1)$, $SSC(G_2)$, $SSC(G_3)$, ..., $SSC(G_M)$–original group with no cyclic shift,
$SSC(G_M)$, $SSC(G_1)$, $SSC(G_2)$, ..., $SSC(G_{M-1})$–cyclic shift of one,
$SSC(G_{M-1})$, $SSC(G_M)$, $SSC(G_1)$, ..., $SSC(G_{M-2})$–cyclic shift of two, ..., and
$SSC(G_2)$, $SSC(G_3)$, $SSC(G_4)$, ..., $SSC(G_1)$–cyclic shift of M-1.

The cyclic shifting above is on indices $G_1$ through $G_M$ for the M SSC sequences and not on any SSC sequence itself. Up to M different groups of M SSC sequences may be formed with up to M different cyclic shifts of the original group of M SSC sequences. These different cyclically shifted groups of M SSC sequences may be assigned to different Node Bs located throughout the system. The Node Bs assigned with the cyclically shifted groups of M SSC sequences may be spaced apart such that no UE can detect more than one cyclically shifted group of M SSC sequences from more than one Node B. This may avoid ambiguity in detection of cells in different Node Bs.

In one design, three cyclically shifted groups of three SSC sequences may be formed as follows:
$SSC(G_1)$, $SSC(G_2)$, $SSC(G_3)$–original group with no cyclic shift,
$SSC(G_3)$, $SSC(G_1)$, $SSC(G_2)$–cyclic shift of one, and
$SSC(G_2)$, $SSC(G_3)$, $SSC(G_1)$–cyclic shift of two.

In one design, the three cyclically shifted groups of three SSC sequences may be assigned to three Node Bs, as shown in Table 1. For the design shown in Table 1, three PSC sequences and a different cyclically shifted group of SSC sequences are used for the three cells in each Node B, and nine unique cell IDs are used for the nine cells in the three Node Bs.

TABLE 1

|  | Cell 1 | Cell 2 | Cell 3 |
| --- | --- | --- | --- |
| Node B1 | PSC(0), SSC($G_1$) | PSC(1), SSC($G_2$) | PSC(2), SSC($G_3$) |
| Node B2 | PSC(0), SSC($G_3$) | PSC(1), SSC($G_1$) | PSC(2), SSC($G_2$) |
| Node B3 | PSC(0), SSC($G_2$) | PSC(1), SSC($G_3$) | PSC(2), SSC($G_1$) |

The design in Table 1 has the following beneficial characteristics:
Each cell in a given Node B uses a different PSC sequence,
Each cell in a given Node B uses a different SSC sequence,
The PSC from each cell may be used as a phase reference for SSC detection, and
The SSC from each cell may be used as a phase reference for demodulating other downlink physical channels from that cell.

In another design, the three cyclically shifted groups of three. SSC sequences may be assigned to three Node Bs, as shown in Table 2. For the design shown in Table 2, a single PSC sequence PSC(x) is used for all cells in the three Node Bs, a different cyclically shifted group of SSC sequences is used for three cells in each Node B, and the same three unique cell IDs are used for the three cells in each of the Node Bs.

TABLE 2

|  | Cell 1 | Cell 2 | Cell 3 |
| --- | --- | --- | --- |
| Node B1 | PSC(x), SSC($G_1$) | PSC(x), SSC($G_2$) | PSC(x), SSC($G_3$) |
| Node B2 | PSC(x), SSC($G_3$) | PSC(x), SSC($G_1$) | PSC(x), SSC($G_2$) |
| Node B3 | PSC(x), SSC($G_2$) | PSC(x), SSC($G_3$) | PSC(x), SSC($G_1$) |

In the designs shown in Tables 1 and 2, three cyclically shifted groups of SSC sequences may be used for three Node Bs. These Node Bs may be spaced sufficiently far apart so that the cells in only one Node B can be detected by any UE.

In general, any number of groups of M SSC sequences may be formed with any number of permutations of an original group of M SSC sequences. The permutations may be achieved with cyclic shifts, which may simplify the generation of additional groups of M SSC sequences and may also ensure use of unique cell IDs for cells assigned with these groups of M SSC sequences. The permutations may also be achieved by re-ordering the M SSC sequences in other manners.

In one design, specific SSC sequences may be grouped together and used for cells in the same Node B. For example, the available SSC sequences may be arranged into groups of M SSC sequences, and each group of M SSC sequences may be used for cells in one Node, B. This design would allow a UE to ascertain whether detected cells are in the same Node B. This information may be useful for more efficient operation. For example, since cells in the same Node B have the same timing, the UE may acquire the timing of only the first cell in a given Node B and may use this timing for each remaining cell in the Node B. The UE may also be able to perform intra-Node B handover from one cell to another cell in the same Node B without having to perform random access, which may be required for inter-Node B handover.

In another design, a larger group of more than M SSC sequences may be formed with different permuted (e.g., cyclically shifted) groups of M SSC sequences. The larger group of more than M SSC sequences may be assigned to a Node B with more than M cells. For example, M may be equal to three, and a group of three SSC sequences $SSC(G_1)$, SSC($G_2$) and SSC($G_3$) may be formed. A larger group of K SSC sequences may be formed with different cynically shifted groups of three SSC sequences, where K may be equal to 4, 5, 6, etc. K may or may not be an integer multiple of M. The larger group of K SSC sequences may be assigned to a Node B with K cells. This design may be used to support Nude, Bs with different numbers of cells and may further allow the UEs to determine cells in the same Node B based on the detected SSC sequences.

The techniques described herein may provide the following advantages:
  Prevent phase mismatch between the PSC and SSC of each cell,
  Prevent phase mismatch between the SSC and other downlink channels of each cell,
  Simple cyclic shift construction of additional groups of SSC sequences, and
  Enable the UEs to determine cells in the same Node B even when there are more than three cells in the Node B.

Figure 4:
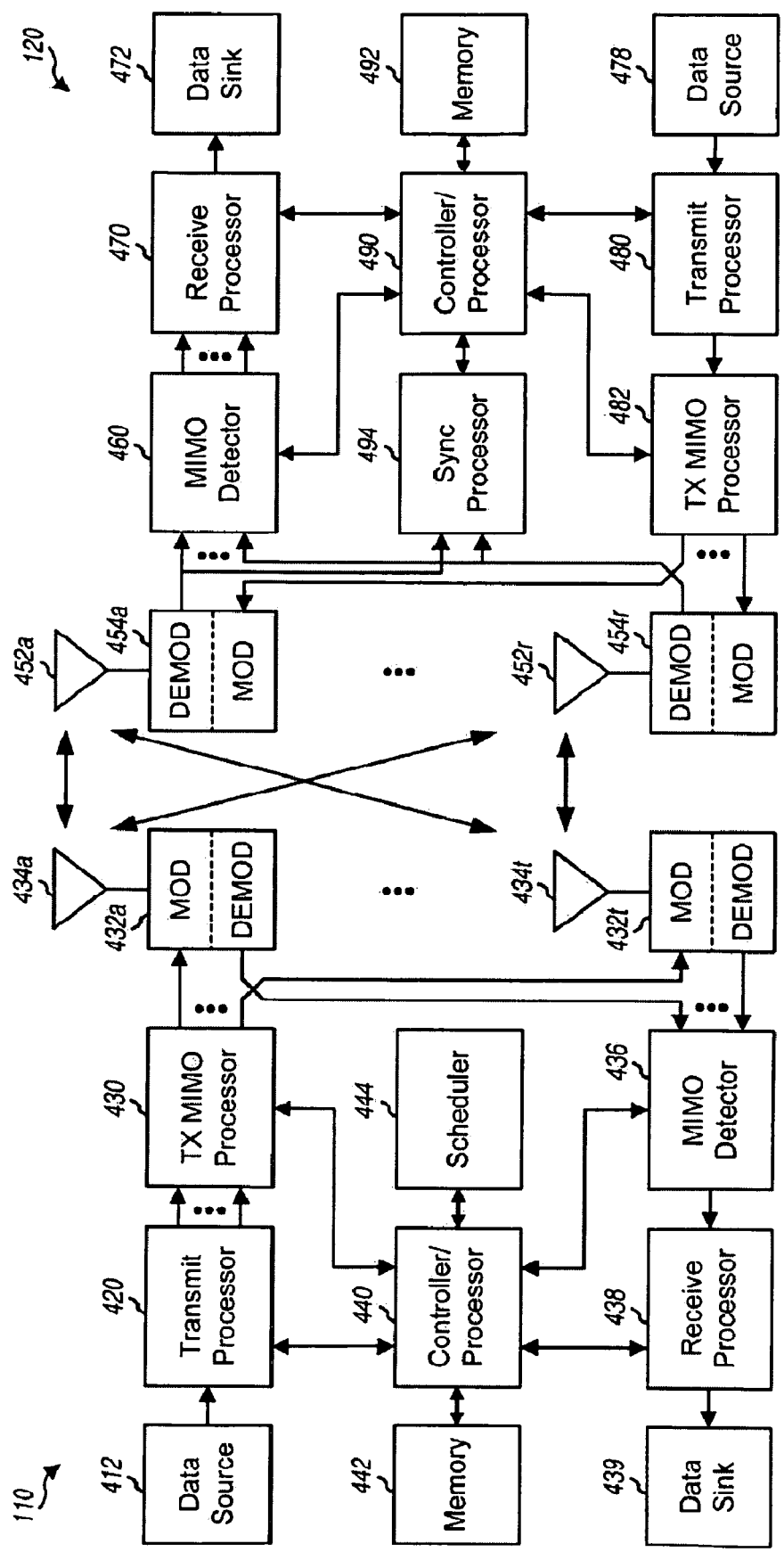
FIG. 4 shows a block diagram of a Node, B and a UE.

FIG. 4 shows a block diagram of a design of a Node B 110 and a UE 120, which are one of the Node Bs and one of the UEs in FIG. 1. In this design, Node B 110 is equipped with T antennas 434a through 434t, and UE 120 is equipped with R antennas 452a through 452r, where in general $T \geq 1$ and $R \geq 1$.

At Node B 110, a transmit processor 420 may receive data for one or more UEs from a data source 412, process the data for each UE based on one or more modulation and coding schemes selected for that UE, and provide data symbols for all UEs. Transmit processor 420 may also generate the primary and secondary synchronization signals for each cell and provide samples for all primary and secondary synchronization signals. A transmit (TX) multiple-input multiple-output (MIMO) processor 430 may multiplex the data symbols, pilot symbols, and samples for the synchronization signals, perform spatial processing (e.g., precoding) on the multiplexed symbols and samples if applicable, and provide T output symbol streams to T modulators (MODs) 432a through 432t. Each modulator 432 may process a respective output symbol stream (e.g., for OFDM) to obtain an output chip stream. Each modulator 432 may further process (e.g., convert to analog, amplify, filter, and upconvert) the output chip stream to obtain a downlink signal. T downlink signals from modulators 432a through 432t may be transmitted via T antennas 434a through 434t, respectively.

At UE 120, antennas 452a through 452r may receive the downlink signals from Node B 110 and provide receive signals to demodulators (DEMODs) 454a through 454r, respectively. Each demodulator 454 may condition (e.g., filter, amplify, downconvert, and digitize) a respective received signal to obtain input samples and may further process the input samples (e.g., for OFDM) to obtain received symbols. A MIMO detector 460 may obtain received symbols from all R demodulators 454a through 454r, perform MIMO detection on the received symbols if applicable, and provide detected symbols. A receive processor 470 may process (e.g., demodulate, deinterleave, and decode) the detected symbols and provide decoded data for UE 120 to a data sink 472. In general, the processing by MIMO detector 460 and receive processor 470 is complementary to the processing by TX MIMO processor 430 and transmit processor 410 at Node B 110.

On the uplink, at UE 120, data from a data source 478 and signaling from a controller/processor 490 may be processed by a transmit processor 480, further processed by a TX MIMO processor 482 if applicable, conditioned by modulators 454a through 454r, and transmitted to Node B 110. At Node B 110, the uplink signals from UE 120 may be received by antennas 434, conditioned by demodulators 432, processed by a MIMO detector 436 if applicable, and further processed by a receive processor 438 to obtain the data and signaling transmitted by UE 120.

Controllers/processors 440 and 490 may direct the operation at Node B 110 and UE 120, respectively. Memories 442 and 492 may store data and program codes for Node B 110 and UE 120, respectively. A synchronization (Sync) processor 494 may detect for primary and secondary synchronization signals from cells based on the input samples and may provide detected cells and their timing cell IDs, etc. A scheduler 444 may schedule UEs for downlink and/or uplink transmission and may provide assignments of resources for the scheduled UEs.

Figure 5:
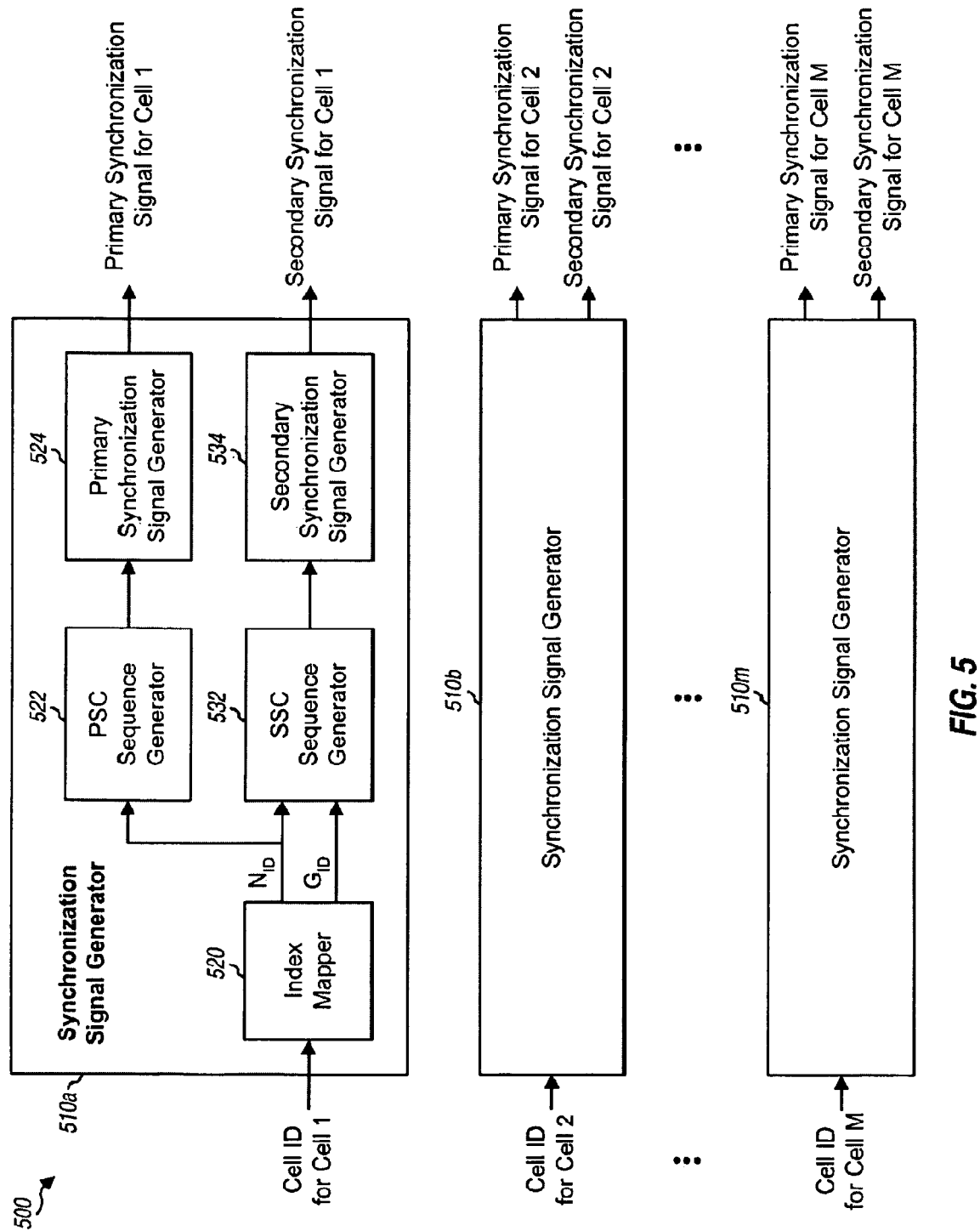
FIG. 5 shows a block diagram of a synchronization signal generator.

FIG. 5 shows a block diagram of a design of a synchronization signal generator 500 for Node B 110. Generator 500 may be part of transmit processor 420 and/or modulators 432 in FIG. 4. Generator 500 includes M synchronization signal generators 510a through 510m for M cells in the Node B. Each generator 510 receives the cell ID for its cell and generates the primary and secondary synchronization signals for the cell.

Within generator 510a for cell 1, an index mapper 520 receives the cell ID for cell 1 and provides indices $G_{ID}$ and $N_{ID}$ for the cell ID, e.g., as shown in equation (1). A generator 522 generates a PSC sequence for cell 1 based on the index $N_{ID}$, e.g., as shown in equation (2). A generator 524 generates a primary synchronization signal for cell 1 based on the PSC sequence, e.g., by mapping the samples in the PSC sequence to subcarriers used for the primary synchronization signal and performing OFDM modulation on the mapped samples.

A generator 532 generates an SSC sequence for cell 1 based on the indices. $G_{ID}$ and $N_{ID}$, e.g., as shown in equation set (3). A generator 534 generates a secondary synchronization signal for cell 1 based on the SSC sequence, e.g., by mapping the samples in the SSC sequence to subcarriers used for the secondary synchronization signal and performing OFDM modulation on the mapped samples.

Generators 510b through 510m similarly generate the primary and secondary synchronization signals for cells 2 through M, respectively. Each generator 510 generates the primary and secondary synchronization signals for its cell based on a different combination of PSC and SSC sequences determined by the cell ID of the cell.

Figure 6:
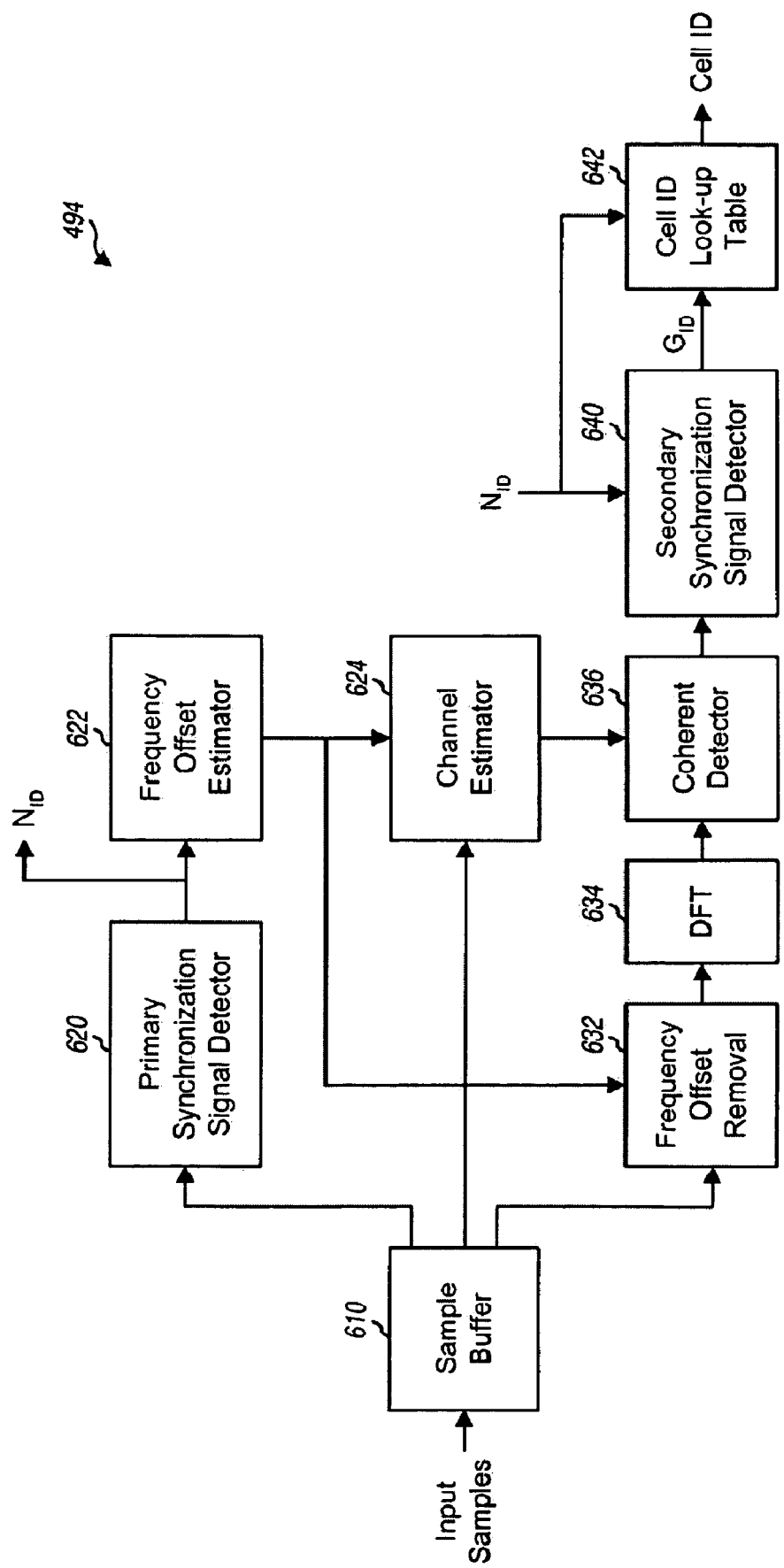
FIG. 6 shows a block diagram of a sync processor at the UE.

FIG. 6 shows a block diagram of a design of sync processor 494 at UE 120 in FIG. 4. Within sync processor 494, a sample buffer 610 may receive and store input samples and provide appropriate input samples when requested. A detector 620 may detect for a primary synchronization signal in each timing hypothesis, e.g., each sample period. Detector 620 may correlate the input samples with different possible PSC sequences to obtain correlation results for each timing hypothesis. Detector 620 may then determine whether or not a primary synchronization signal is detected based on the correlation results. If a primary synchronization signal is detected, then detector 620 may provide the detected PSC sequence, symbol timing, and information (e.g., the $N_{ID}$) sent in the primary synchronization signal. A unit 622 may estimate frequency offset based on the correlation results from detector 620. A channel estimator 624 may derive a channel estimate by removing the detected PSC sequence from input samples and deriving channel gains for different subcarriers.

SSC detection may be performed whenever a primary synchronization signal is detected. A unit 632 may obtain input samples for an OFDM symbol (e.g., in slot 0 or 10) and remove the estimated frequency offset from these samples. A discrete Fourier transform (DFT) unit 634 may transform the frequency-corrected samples to the frequency domain and provide received symbols. A coherent detector 636 may perform coherent detection of the received symbols with the channel gains from channel estimator 624 and provide input symbols. A detector 640 may detect for a secondary synchronization signal based on the input symbols and cell ID information (e.g., the $N_{ID}$) from detector 620. Detector 640 may correlate the input symbols with different possible SSC sequences to obtain correlation results and may determine whether or not a secondary synchronization signal is detected based on the correlation results. If a secondary synchronization signal is detected, then detector 640 may provide the detected SSC sequence, frame timing, and information (e.g., the $G_{ID}$) sent in die secondary synchronization signal. A look-up table 642 may receive the detected $G_{ID}$ and $N_{ID}$ and provide the cell ID of each detected cell.

FIG. 7 shows a design of a process 700 for transmitting synchronization signals in a wireless communication system. Process 700 may be performed by a Node B. At least one PSC sequence may be used for multiple cells in a first Node 13 (block 712). Multiple SSC sequences may be used for the multiple cells in the first Node B, with a different permutation of the multiple SSC sequences being used for multiple cells in a second Node B (block 714). The multiple SSC sequences may be associated together and used to identify cells belonging in the same Node B. The first and second Node Bs may be spaced apart such that cells from at most one of the first and second Node Bs are detectable by any UE in the system.

A primary synchronization signal may be generated for each cell in the first Node B based on a PSC sequence for that cell (block 716). For block 716, samples of the PSC sequence may be mapped to subcarriers, and the primary synchronization signal may be generated with the mapped samples (e.g., by performing OFDM modulation on the mapped samples). A secondary synchronization signal may be generated for each cell in the first Node B based on an SSC sequence for that cell (block 718). For block 718, samples of the SSC sequence may be mapped to subcarriers, and the secondary synchronization signal may be generated with the mapped samples.

In one design, a single PSC sequence may be used for all cells in the first Node B. In another design, different PSC sequences may be used for adjacent cells in the first Node B. In yet another design, a different PSC sequence may be used for each cell in the first Node B, so that no two cells use the same PSC sequence. In one design, a different SSC sequence may be used for each cell in the first Node B, so that no, two cells use the same SSC sequence. In another design, different SSC sequences may be used for adjacent cells in the first Node B.

In one design, three. PSC sequences and three SSC sequences are used for three cells in the first Node B, and a permutation (e.g., a cyclic shift) of the three SSC sequences is used for three cells in the second Node B. Three SSC sequences $SSC(G_1)$, $SSC(G_2)$ and $SSC(C_3)$ may be used for three cells 1, 2 and 3, respectively, in the first Node B, where $G_1$, $G_2$ and $G_3$ are indices of the three SSC sequences. A first permutation comprising $SSC(G_3)$, $SSC(G_1)$ and $SSC(G_2)$ or a second permutation comprising $SSC(G_2)$, $SSC(G_3)$ and $SSC(G_1)$ may be used for three cells 1, 2 and 3, respectively, in the second Node B.

The PSC sequence and the SSC sequence for each cell in the first Node B may be determined based on a cell ID of that cell. In one design, the multiple cells in the first Node B and the multiple cells in the second Node B are assigned different cell IDs. A different combination of PSC sequence and SSC sequence may be used for each cell in the first and second Node Bs.

FIG. 8 shows a design of an apparatus 800 for transmitting synchronization signals in a wireless communication system. Apparatus 800 includes a module 812 to use at least one PSC sequence for multiple cells in a first Node B, a module 814 to use multiple SSC sequences for the multiple cells in the first Node B, with a different permutation of the multiple SSC sequences being used for multiple cells in a second Node B, a module 816 to generate a primary synchronization signal for each cell in the first Node B based on a PSC sequence for that cell, and a module 818 to generate a secondary synchronization signal for each cell in the first Node B based on an SSC sequence for that cell.

Figure 9:
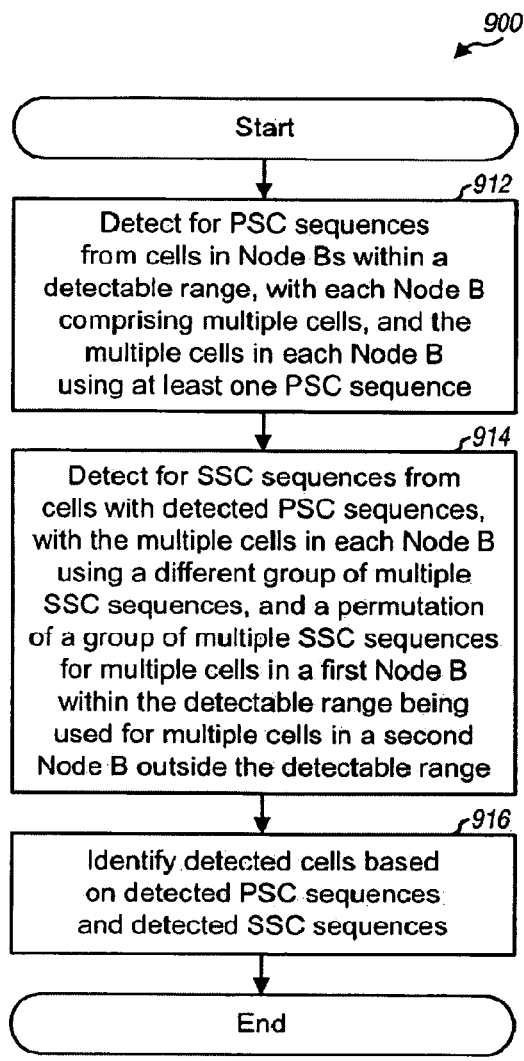
FIG. 9 shows a process for detecting for cells.

FIG. 9 shows a design of a process 900 for detecting for cells in a wireless communication system. Process 900 may be performed by a LYE. The UE may detect for PSC sequences from cells in Node Bs within a detectable range (block 912). Each Node B may comprise multiple cells, and the multiple cells in each Node B may use at least one PSC sequence. The UE may detect for SSC sequences from cells with detected PSC sequences (block 914). The multiple cells in each Node B may use a different group of multiple SSC sequences. A permutation of a group of multiple SSC sequences used for multiple cells in a first Node B within the detectable range may be used for multiple cells in a second Node B outside the detectable range. The UE may identify detected cells based on detected PSC sequences and detected SSC sequences (block 916). For example, the UE may determine a cell ID of each detected cell based on the detected PSC sequence and SSC sequence for that cell. The UE may also identify detected cells belonging in the same Node B based on the different group of multiple SSC sequences used for the multiple cells in each Node B.

In one design, the UE may detect for at least one PSC sequence from three cells in each Node B within the detectable range. The UE may detect for SSC sequences from cells with detected PSC sequences, with the three cells in each Node B using a different group of three SSC sequences. A permutation of a group of three SSC sequences for three-cells in the first Node B may be used for three cells in the second Node B.

In one design of block 912, the UBE may detect for primary synchronization signals from cells in Node Bs within the detectable range and may identify a PSC sequence for each cell with a detected primary synchronization signal. In one design of block 914, the UE may detect for a secondary synchronization signal from each cell with a detected primary synchronization signal and may identify an SSC sequence for each cell with a detected secondary synchronization signal. The UE may derive a channel estimate for each cell with a detected primary synchronization signal based on the detected primary synchronization signal. The UE may then detect for the secondary synchronization signal from each cell with a detected primary synchronization signal based on the channel estimate for that cell. In one design, the UE may derive a channel estimate for each cell with a detected secondary synchronization signal based on the detected secondary synchronization signal. The UE may then demodulate at least one physical channel from each cell with a detected secondary synchronization signal based on the channel estimate for that cell.

Figure 10:
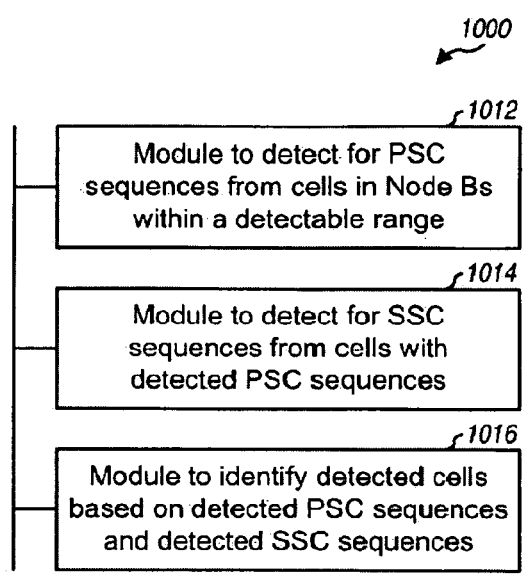
FIG. 10 shows an apparatus for detecting for cells.

FIG. 10 shows a design of an apparatus 1000 for detecting for cells in a wireless communication system. Apparatus 1000 includes a module 1012 to detect for PSC sequences from cells in Node Bs within a detectable range, a module 1014 to detect for SSC sequences from cells with detected PSC sequences, and a module 1016 to identify detected cells based on detected PSC sequences and detected SSC sequences.

The modules in FIGS. 8 and 10 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and stops have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with, a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and, a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. All exemplary storage medium is coupled to the processor such that the processor can read information from, and write information to, the storage medium In the alternative, the storage medium may be integral to the processor. The processor and the storage medium may reside in all ASIC. The ASIC may reside in a user terminal. In the alternative, the processor and the storage medium may reside as discrete components in a user terminal.

In one or more exemplary designs, die functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic-storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting synchronization signals in a wireless communication system, comprising:
   using at least one primary synchronization code (PSC) sequence for multiple cells in a first Node B; and
   using multiple secondary synchronization code (SSC) sequences for the multiple cells in the first Node B, and wherein a different permutation of the multiple SSC sequences is used for multiple cells in a second Node B.

2. The method of claim 1, further comprising:
   determining a PSC sequence and an SSC sequence for each cell in the first Node B based on a cell identity (ID) of the cell.

3. The method of claim 1, wherein the multiple cells in the first Node B and the multiple cells in the second Node B are assigned different cell identities (IDs), and wherein a different combination of PSC sequence and SSC sequence is used for each cell in the first and second Node Bs.

4. The method of claim 1, further comprising:
   generating a primary synchronization signal for each cell in the first Node B based on a PSC sequence for the cell; and
   generating a secondary synchronization signal for each cell in the first Node B based on an SSC sequence for the cell.

5. The method of claim 1, wherein the using at least one PSC sequence for the multiple cells in the first Node B comprises using different. PSC sequences for adjacent cells in the first Node B.

6. The method of claim 1, wherein the using at least one PSC sequence for the multiple cells in the first Node B comprises using a single PSC sequence for all of the multiple ells in the first Node B.

7. The method of claim 1, wherein the using at least one PSC sequence for the multiple cells in the first Node B comprises using a different PSC sequence for each of the multiple cells in the first Node B.

8. The method of claim 1, wherein the using multiple SSC sequences for the multiple cells in the first Node B comprises using a different SSC sequence for each of the multiple cells in the first Node B.

9. The method of claim 1, wherein SSC sequences available in the system are arranged into a plurality of original groups of M SSC sequences, wherein additional groups of M SSC sequences are formed based on different permutations of each original group of M SSC sequences, and wherein cells in each Node B is assigned one-group of M SSC sequences, where M is an integer greater than one.

10. The method of claim 9, wherein the additional groups of M SSC sequences are formed based on different cyclic shifts of each original group of M SSC sequences.

11. The method of claim 1, wherein the using at least one PSC sequence four the multiple cells in the first Node B comprises using three PSC sequences for three cells in the first Node B, wherein the using multiple SSC sequences for the multiple cells in the first Node B comprises using three SSC sequences for the three cells in the first Node B, and wherein a permutation of the three SSC sequences is used for three cells in the second Node B.

12. The method of claim 1, wherein the using multiple. SSC sequences for the multiple cells in the first Node B comprises using three SSC sequences $SSC(G_1)$, $SSC(G_2)$ and $SSC(G_3)$ for three cells 1, 2 and 3, respectively, in the first Node B, where $G_1$, $G_2$ and $G_3$ are indices of the three SSC sequences, and wherein a first permutation comprising SSC $(G_3)$, $SSC(G_1)$ and $SSC(G_2)$ or a second permutation comprising $SSC(G_2)$, $SSC(G_3)$ and $SSC(G_1)$ is used for three cells 1, 2 and 3, respectively, in the second Node B.

13. The method of claim 1, wherein the multiple SSC sequences are associated together and used to identify cells belonging in same Node B.

14. The method of claim 1, wherein the first and second Node Bs are spaced apart such that cells from at most one of the first and second Node Bs are detectable by any user equipment (UE) in the system.

15. An apparatus for wireless communication, comprising:
at least one processor configured to use at least one primary synchronization code (PSC) sequence for multiple cells in a first Node B, and to use multiple secondary synchronization code (SSC) sequences for the multiple cells in the first Node B, and wherein a different permutation of the multiple SSC sequences is used for multiple cells in a second Node B.

16. The apparatus of claim 15, wherein the multiple cells in the first Node B and the multiple cells in the second Node B are assigned different cell identities (IDs), and wherein a different combination of PSC sequence and SSC sequence is used for each cell in the first and second Node Bs.

17. The apparatus of claim 15, wherein the at least one processor is configured to use a different SSC sequence for each of the multiple cells in the first Node B.

18. The apparatus of claim 15, wherein the at least one processor is configured to use three SSC sequences $SSC(G_1)$, $SSC(G_2)$ and $SSC(G_3)$ for three cells 1, 2 and 3, respectively, in the first Node B, where $G_1$, $G_2$ and $G_3$ are indices of the three SSC sequences, and wherein a first permutation comprising $SSC(G_3)$, $SSC(G_1)$ and $SSC(G_2)$ or a second permutation comprising $SSC(G_2)$, $SSC(G_3)$ and $SSC(G_1)$ is used for three cells 1, 2 and 3, respectively, in the second Node B.

19. An apparatus for wireless communication, comprising:
means for using at least one primary synchronization code (PSC) sequence for multiple cells in a first Node B; and
means for using multiple secondary synchronization code (SSC) sequences for the multiple cells in the first Node B, and wherein a different permutation of the multiple SSC sequences is used for multiple cells in a second Node B.

20. The apparatus of claim 19, wherein the multiple cells in the first Node B and the multiple cells in the second Node B are assigned different cell identities (IDs), and wherein a different combination of PSC sequence and SSC sequence is used for each cell in the first and second Node Bs.

21. The apparatus of claim 19, wherein the means for using multiple SSC sequences for the multiple cells in the first Node B comprises means for using a different SSC sequence for each of the multiple cells in the first Node B.

22. The apparatus of claim 19, wherein the means for using multiple SSC sequences for the multiple cells in the first Node B comprises means for using three SSC sequences $SSC(G_1)$, $SSC(G_2)$ and $SSC(G_3)$ for three cells 1, 2 and 3, respectively, in the first Node B, where $G_1$, $G_2$ and $G_3$ are indices of the three SSC sequences, and wherein a first permutation comprising $SSC(G_3)$, $SSC(G_1)$ and $SSC(G_2)$ or a second permutation comprising $SSC(G_2)$, $SSC(G_3)$ and $SSC(G_1)$ is used for three cells 1, 2 and 3, respectively, in the second Node B.

23. A computer program product, comprising:
a computer-readable medium comprising:
code for causing at least one computer to use at least one primary synchronization code (PSC) sequence for multiple cells in a first Node B; and
code for causing the at least one computer to use multiple secondary synchronization code (SSC) sequences for the multiple cells in the first Node B, wherein a different permutation of the multiple SSC sequences is used for multiple cells in a second Node B.

24. A method of detecting for cells in a wireless communication system, comprising:
detecting for primary synchronization code (PSC) sequences from cells in Node Bs within a detectable range, each Node B comprising multiple cells, the multiple cells in each Node B using at least one PSC sequence;
detecting for secondary synchronization code (SSC) sequences from cells with detected PSC sequences, the multiple cells in each Node B using a different group of multiple SSC sequences, and wherein a permutation of a group of multiple SSC sequences for multiple cells in a first Node B within the detectable range is used for multiple cells in a second Node B outside the detectable range; and
identifying detected cells based on detected PSC sequences and detected SSC sequences.

25. The method of claim 24, further comprising:
determining a cell identity (ID) of each detected cell based on a detected PSC sequence and a detected SSC sequence for the cell.

26. The method of claim 24, further comprising:
identifying detected cells in same Node B based on the different group of multiple SSC sequences used for the multiple cells in each Node B.

27. The method of claim 24, wherein the detecting for PSC sequences comprises detecting for at least one PSC sequence from three cells in each Node B within the detectable range, wherein the detecting for SSC sequences comprises detecting for SSC sequences from cells with detected PSC sequences, the three cells in each Node B using a different group of three SSC sequences, and wherein a permutation of a group of three SSC sequences for three cells in the first Node B is used for three cells in the second Node B.

28. The method of claim 24, wherein the detecting for PSC sequences from cells in Node Bs within the detectable range comprises
   detecting for primary synchronization signals from the cells in the Node Bs within the detectable range, and
   identifying a PSC sequence for each cell with a detected primary synchronization signal.

29. The method of claim 28, wherein the detecting for SSC sequences from cells with detected PSC sequences further comprises
   deriving a channel estimate for each cell with a detected primary synchronization signal based on the detected primary synchronization signal, and
   detecting for a secondary synchronization signal from each cell with a detected primary synchronization signal based on the channel estimate for the cell.

30. The method of claim 28, wherein the detecting for SSC sequences from cells with detected PSC sequences comprises
   detecting for a secondary synchronization signal from each cell with a detected primary synchronization signal, and
   identifying an SSC sequence for each cell with a detected secondary synchronization signal.

31. The method of claim 30, further comprising:
   deriving a channel estimate for each cell with a detected secondary synchronization signal based on the detected secondary synchronization signal; and
   demodulating at least one physical channel from each cell with a detected secondary synchronization signal based on the channel estimate for the cell.

32. An apparatus for wireless communication, comprising:
   at least one processor configured to detect for primary synchronization code (PSC) sequences from cells in Node Bs within a detectable range, to detect for secondary synchronization code (SSC) sequences from cells with detected PSC sequences, and to identify detected cells based on detected PSC sequences and detected SSC sequences, wherein each Node B comprises multiple cells, the multiple cells in each Node B using at least one PSC sequence and a different group of multiple SSC sequences, and wherein a permutation of a group of multiple SSC sequences for multiple cells in a first Node B within the detectable range is used for multiple cells in a second Node B outside the detectable range.

33. The apparatus of claim 32, wherein the at least one processor is configured to detect for at least one PSC sequence from three cells in each Node B within the detectable range, and to detect for SSC sequences from cells with detected PSC sequences, the three cells in each Node B using a different group of three SSC sequences; and wherein a permutation of a group of three SSC sequences for three cells in the first Node B is used for three cells in the second Node B.

34. The apparatus of claim 32, wherein the at least one processor is configured to detect for primary synchronization signals from the cells in the Node Bs within the detectable range, and to identify a PSC sequence for each cell with a detected primary synchronization-signal.

35. The apparatus of claim 34, wherein the at least one processor is configured to derive a channel estimate for each cell with a detected primary synchronization signal based on the detected primary synchronization signal, and to detect for a secondary synchronization signal from each cell with a detected primary synchronization signal based on the channel estimate for the cell.

36. The apparatus of claim 34, wherein the at least one processor is configured to detect for a secondary synchronization signal from each cell with a detected primary synchronization signal, and to identify an SSC sequence for each cell with a detected secondary synchronization signal.

37. The apparatus of claim 36, wherein the at least one processor is configured to derive a channel estimate for each cell with a detected secondary synchronization signal based on the detected secondary synchronization signal, and to demodulate at least one physical channel from each cell with a detected secondary synchronization signal based on the channel estimate for the cell.

* * * * *